United States Patent [19]

Hayashida et al.

[11] Patent Number: 4,931,982
[45] Date of Patent: Jun. 5, 1990

[54] METHOD FOR CONTROLLING THE THICKNESS OF A SHEET MATERIAL AND METHOD FOR MONITORING A CORRESPONDENCE RELATIONSHIP BETWEEN THE THICKNESS DISTRIBUTION ACROSS A SHEET MATERIAL AND MEANS FOR ADJUSTING THE THICKNESS

[75] Inventors: Shinichiro Hayashida, North Kingstown, R.I.; Hidetoshi Okashiro; Shunichi Yorozu, both of Otsu, Japan

[73] Assignee: Toray Industries, Inc., Tokyo, Japan

[21] Appl. No.: 219,196

[22] Filed: Jul. 15, 1988

[30] Foreign Application Priority Data

Jul. 17, 1987 [JP] Japan ................. 62-177127

[51] Int. Cl.$^5$ ................. B29F 3/00; D21F 1/00
[52] U.S. Cl. ................. 364/473; 425/141
[58] Field of Search ................. 425/141–145; 364/473

[56] References Cited

U.S. PATENT DOCUMENTS

| | | | |
|---|---|---|---|
| 4,124,342 | 12/1978 | Akatsuka et al. | 425/141 |
| 4,514,348 | 4/1985 | Iguchi et al. | 425/172 |
| 4,680,089 | 7/1987 | Aral et al. | 425/14 |

FOREIGN PATENT DOCUMENTS

| | | |
|---|---|---|
| 0035356 | 9/1981 | European Pat. Off. . |
| 52-36154 | 3/1977 | Japan . |
| 52-36165 | 3/1977 | Japan . |
| 56-120318 | 9/1981 | Japan . |
| 56-133135 | 10/1981 | Japan . |
| 58-78726 | 5/1983 | Japan . |
| 60-132727 | 7/1985 | Japan . |
| 60-225730 | 11/1985 | Japan . |
| 117321 | 5/1987 | Japan . |

OTHER PUBLICATIONS

"Comparison of a Kalman Filter and its U-D Factorisation from the Viewpoint of Applications in Microprocessor Adaptive Controllers"; Automatizce (Czechoslovakia); vol. 25, No. 10, pp. 238-241; Oct. 1982.

Primary Examiner—Allen MacDonald

[57] ABSTRACT

The thickness distribution across a sheet material, formed by biaxially stretching a molten material web delivered from a die, is automatically controlled by a control processing wait. A correspondence relationship between adjustment of adjusting means arranged on the die and the variation of thickness distribution of the sheet material after formation thereof is sequentially estimated using a Kalman filter built into the control processing unit. Responsive to the estimated relationship, the adjusting means are controlled by optimum amounts in order to enable the thickness distribution to approach a target distribution. The accuracy of thickness control of the sheet material can be greatly increased and accurate control can automatically follow any variation in the conditiond of a sheet forming process. The correspondence relationship between the thickness distribution of the sheet material and the adjusting means on the die can be monitored and displayed. Responsive to the displayed relationship, information capable of being fed back to the sheet forming process and effective to render uniform the quality of the sheet material in the width direction can be observed.

24 Claims, 8 Drawing Sheets

WIDTH DIRECTION
OF SHEET MATERIAL

METHOD FOR CONTROLLING THE THICKNESS OF A SHEET MATERIAL AND METHOD FOR MONITORING A CORRESPONDENCE RELATIONSHIP BETWEEN THE THICKNESS DISTRIBUTION ACROSS A SHEET MATERIAL AND MEANS FOR ADJUSTING THE THICKNESS

BACKGROUND OF THE INVENTION

1. Field of the Invention:

The present invention relates to a method for controlling the thickness of a sheet material and for monitoring a correspondence relationship between the thickness distribution across a sheet material and means for adjusting the thickness of the sheet material. More particularly the present invention relates to a thickness control method which can provide a sheet material at a target thickness and thickness distribution with high accuracy and can compensate for any variation in a sheet forming process, by obtaining an accurate correspondence relationship between a plurality of adjusting means disposed on a die and the thickness distribution of a formed sheet material, and to a monitoring method wherein feedback information useful for a sheet forming process can be obtained.

2. Description of the Prior Arts:

Various processes for producing a sheet material are known which include methods of controlling the thickness of, and the thickness distribution across, the sheet. In such processes a molten material, for example, a molten resin, is continuously delivered from a die in the form of a web and subjected to a sheet forming process, for example, a stretching process. The thickness of, and the thickness distribution across (i.e. in the width direction), the sheet material after formation thereof by the sheet forming process is measured by a thickness gauge, and a plurality of adjusting means arranged on the die in the width direction of the web of molten material are controlled so that the thickness distribution of the sheet material to be measured can approach a pre-determined target distribution.

For instance, such thickness control methods are disclosed in JP-A Nos. 52-36154, 52-36165, 56-120318, 56-133135, 58-78726, 60-132727 and 60-225730, mainly in processes for producing resin films. All these methods are based on the premise that a correspondence relationship between the position of the adjusting means on the die and the position in the width direction of the formed sheet material at which position the thickness of the sheet is varied by the adjustment of the adjusting means is fully determined prior to commencement of the sheet forming process.

However, in practice, in these conventional methods the above correspondence relationship can not be obtained with a high accuracy because, in such conventional methods, there are certain limits to the extent to which the accuracy of control of the thickness of the sheet material after formation by the sheet forming process can be increased.

Figures 13, 14, 15:
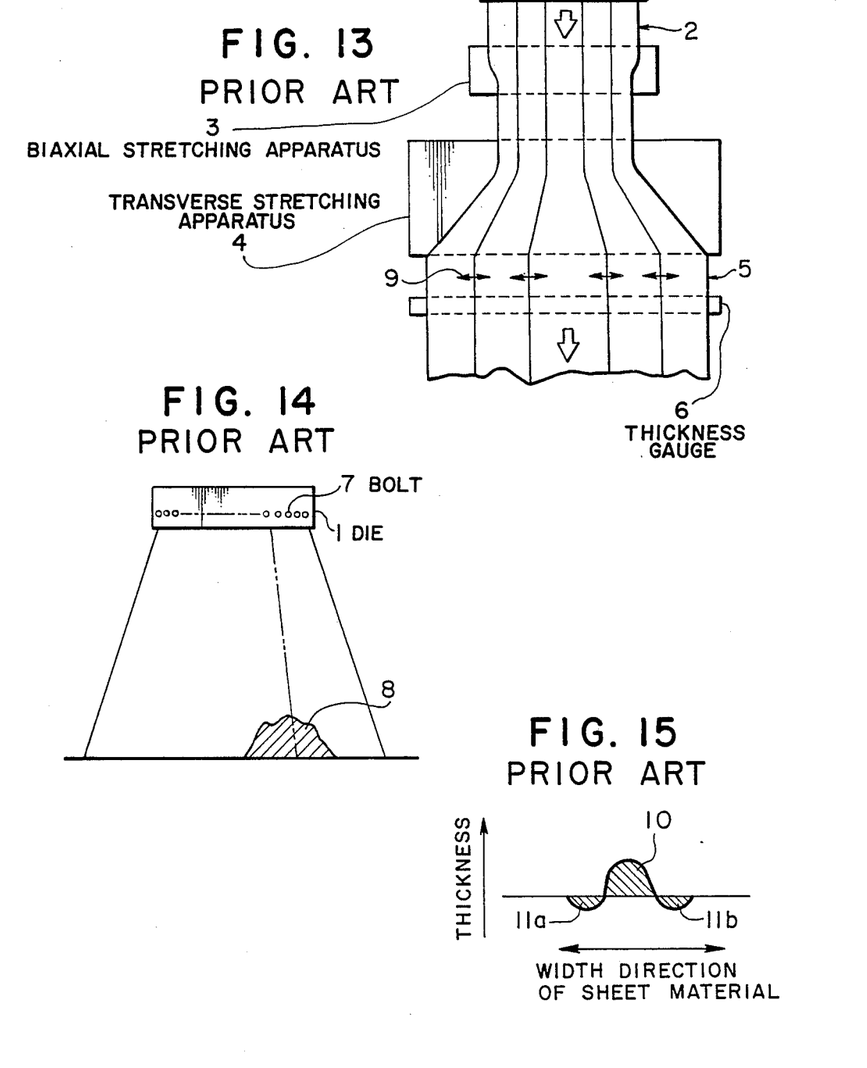
FIG. 13 is a schematic plan view of a system for carrying out the conventional sheet material manufacturing process showing a correspondence relationship between positions of adjusting means on a die and positions in a sheet material after formation thereof.
FIG. 14 is a schematic plan view of a part of the system shown in FIG. 13 showing a forced test.
FIG. 15 is a graph showing a thickness variation of the sheet material obtained by a unit adjustment of the adjusting means shown in FIG. 13.

For instance, a conventional sheet forming system for producing a biaxially oriented plastics film as a sheet material is schematically shown in FIG. 13. A web of molten resin 2 delivered from a die 1 is stretched biaxially by an apparatus 3 for longitudinally stretching the material and an apparatus 4 for transversely stretching the material so that a biaxially oriented plastics film 5 having a certain thickness is formed after passing through the system. The thickness distribution of the film 5 is measured, for example, by a scanning type thickness gauge 6. In a case where the width of the film 5 is 5-10 m, measuring positions of the thickness gauge 6 are provided, for example, at 300 points in the width direction of the film and a plurality of adjusting means disposed on the die 1, for example, adjusting bolts 7 for adjusting a gap provided by a slit of the die, are provided, there being for example, 100 in number.

In order to determine a correspondence relationship between the respective positions of each of the many such adjusting bolts 7 and the respective positions of the film 5 at which the thickness of material is varied by the adjustment of the respective bolts, that is, the influence of the adjustment of the bolts on the thickness of the film, it is usually necessary to carry out the following "forced" test. Namely, an appropriately pre-selected adjusting bolt 7 is greatly adjusted forcedly, in other words deliberately, using the system shown in FIG. 14, for example, by 20% of an acceptable adjusting amount. The position of the film 5 at which the thickness of the film greatly varies is determined and thus the correspondence relationship between the position of the adjusting bolt and the position of the film can be obtained.

In another, even less accurate, method of determining this correspondence relationship, the positions of the adjusting bolts 7 and the positions of the film 5 are merely allocated in the width direction of the film under the premise that the central position of the film in the width direction corresponds to the position of a center bolt of a plurality of bolts and/or under the premise that the positions of both edge portions of the film in the width direction correspond to the respective positions of both end bolts of the plurality of bolts. Each of these methods of mere allocation carries with it the assumption that the pitch (i.e. width) of each portion of the film the thickness of which is adjusted by a given respective bolt is the same for each portion.

However, this is not usually the case, because the thickness of a desired film usually varies across its width, being thicker at its edges. Accordingly the respective pitches at edge portions are narrower.

This enables the measured thickness to be used to give some idea of which bolt influences the thickness of a particular portion of the film without the nesessity for the above methods of allocation.

Alternatively, this variation in thickness across the film may be used as a refinement enabling a more accurate allocation of the positions of the bolts by the above-mentioned methods.

However, even if the correspondence relationship between the respective positions of adjusting bolts 7 and the positions of the film 5 is determined by the above-mentioned, slightly more accurate method using the system shown in FIG. 14, it is necessary to adjust a particular bolt 7 to a fairly great extent and to forcedly generate a great thickness variation at a particular position on the film so that the thickness variation can be clearly recognized as in thickness profile 8. A film having such a great nonuniformity of thickness distribution cannot provide a uniform product, and hence the above test, in effect, requires a break-down of the process. Accordingly, a great loss of film is generated during the test, and it takes a considerable period of time to readjust the forcedly operated bolts to their original respective settings and for the thickness and thickness distribution of the film to settle within ranges for which the film can be obtained as a uniform, and therefore useful, product, thereby decreasing the productivity greatly.

Moreover, in the method wherein the correspondence relationship between the positions of adjusting bolts 7 and the positions of the film 5 in the width direction is determined by allocation according to a uniform pitch or mass ratio, or in the method wherein, after the deliberate adjustment test providing a considerable change in thickness as shown in FIG. 14 is carried out in accordance with a procedure in which a plurality of adjusting bolts 7 are appropriately pre-selected, and the remaining bolts between the test bolts are allocated to the positions of the film with a uniform pitch or according to the mass ratio, it is almost impossible to obtain an accurate correspondence relationship between the positions of the bolts and the positions of the film in the width direction, this being because there are stretching processes, particularly the transverse-stretching process carried out by stretching apparatus 4, and uniform stretching is not always performed by this process.

Furthermore, since the conditions of respective film forming processes performed by apparatus 3 and 4 cannot always be constant conditions in themselves or in relation to the film, the treatment conditions and/or stretching conditions may vary. As a result of the variations, the correspondence relationship between the positions of the adjusting bolts 7 and the positions of the film 5 in the width direction varies as shown by arrows 9 in FIG. 13, so that it becomes much more difficult to obtain an accurate relationship.

Thus, since an accurate correspondence relationship cannot be obtained in practice by conventional methods, the bolts 7 are often inadequately adjusted in response to the feedback signals of thickness distribution of the film 5 from the thickness gauge 6, even if accurate measurement can be performed by the thickness gauge. As a result, there is inevitably a certain limit to the extent to which the accuracy of the thickness control of the film 5 can be improved.

Further, there is a problem associated with the degree of adjustment to be made to the adjusting bolts 7. Even if the variation in thickness of the film 5 at a particular position in the width direction where the thickness is to be altered by the deliberate adjustment of the bolt 7 (for example, a 20% adjustment) can be measured, the entire relationship between the degree of adjustment of the bolt and the remitting thickness variation of the film cannot be precisely obtained. Thus, the degree of adjustment of the bolt 7 to be made in the actual production of a useful film 5 is very small, for example, 0.1–0.5%, and the actual amount of variation of the thickness of the film due to such a small adjustment of the bolt does not always become equal to a value calculated proportionally from the above relationship derived from the above test in which the bolts are actively adjusted. The main reason for this is that there are forming processes provided by the stretching apparatus 3 and 4 between the die 1 and the thickness gauge 6. Thus the relationship between the degree of adjustment of the adjusting bolt 7 and the thickness variation of the film 5 is also a complicated correspondence relationship. Still more, in a case where the conditions of the processes carried out by stretching apparatus 3 and 4 fluctuate, it is impossible to determine the correspondence relationship constantly and accurately.

Furthermore, in addition to the abovementioned problem, we have also recognized the following problem associated with the correspondence relationship between the positions of the adjusting bolts 7 and the positions of the film 5 in the width direction.

According to a fairly accurate test which we have carried out, when the adjusting bolt 7 on the die 1 is adjusted by a small unit amount (for example, 0.1–0.5% of an acceptable adjusting amount), this results in a pattern of the variation in thickness of the film 5 at the position where the thickness is varied (this position can be pre-determined by a test such as the abovementioned forced test in which the bolts 7 are actively adjusted to provide the result shown in FIG. 14), for example, as shown in FIG. 15. By a unit amount of adjustment of the bolt 7, the thickness of the film 5 around the position corresponding to the position of the bolt varies as shown by thickness profile 10. At the same time, the thicknesses of both respective portions at either side of the above position of the film 5 in the width direction vary as shown by thickness profiles 11a and 11b, in a thickness direction opposite to the thickness direction of the portion of the thickness profile 10. This pattern results from the fact that when a portion of the molten resin in the die 1 is locally thickened, the molten resin in both side portions of the above central portion in the width direction of the film is drawn toward the central portion due to the flow of the molten resin at the central portion, and the influence of this variation at the die is revealed in the thickness profile of the film 5 after formation. Since the central portion having the thickness profile 10 and the two side portions having the thickness profiles 11a and 11b of the film 5 vary by the unit amount of adjustment of the adjusting bolt 7 in respective directions opposite to each other, if the correspondence relationship between the positions of the adjusting bolts and the positions of the film is not determined accurately as aforementioned, the portion to be adjusted so as to increase the thickness of the film may often be thinned or the portion to be adjusted so as to decrease the thickness may often be thickened. Thus, for this reason also, there exists an unsatisfactory limit to the accuracy of the thickness control of the sheet material which can be achieved by conventional methods.

SUMMARY OF THE INVENTION

The present invention provides a method for controlling the thickness of a sheet material wherein a correspondence relationship between positions and adjustment amounts of adjusting means on a die and positions and amounts of variation in thickness of the sheet material after formation can be determined with very high accuracy without performing a separate preliminary test involving independent actuation of the adjusting means and wherein the accuracy of thickness control of the sheet material can be greatly improved by controlling the positions and adjustment amounts of the adjusting means according to the determined correspondence relationship.

The present invention provides, according to a first aspect, a thickness control method in a process for producing a sheet material which can automatically follow any variation of the conditions of a sheet forming process and can maintain a high accuracy of the thickness control by such following.

According to a second aspect of the present invention it is possible to obtain feedback information for a sheet material forming process effective in providing a sheet material of uniform quality in the width direction, which feedback information is obtained from data derived from the thickness control utilizing at least some of the steps of the above thickness control method.

The present invention provides, according to the first aspect, a method for controlling the thickness of a sheet of material formed by delivering a web of molten material from a die and subjecting the web of molten material to a sheet forming process, which method includes the steps of (1) providing on the die a plurality of means for adjusting the thickness of the web of molten material, (2) for each adjusting means, providing (i) an estimate, which is at least a rough estimate, of a correspondence relationship between (a) a position of the adjusting means on the die in the width direction of the web of molten material and an amount of adjustment of the adjusting means at a given time, and (b) after formation of the sheet material by the sheet forming process, a position on the sheet at which position the thickness of the sheet is varied by the said adjustment of the adjusting means and an amount of thickness variation at a time subsequent to the said given time and caused by the said adjustment at the given time, thereby to obtain an estimated correspondence relational matrix $A^*_{i-1}$ for all said adjusting means, and (ii) a measured thickness distribution, $P_{i-1}$, in the width direction of the sheet material at a time $t_{i-1}$, (3) measuring the thickness distribution, $P_i$, in the width direction of the sheet material at a time $t_i$, (4) using an equation including the estimated correspondence relational matrix, $A^*_{i-1}$, and the measured thickness distribution $P_{i-1}$, (i) calculating an estimated thickness distribution, $P^*_i$, at a time $t_i$ and determining the difference between the estimated thickness distribution $P^*_i$ and the measured thickness distribution $P_i$, and (ii) where a said difference occurs, amending the said estimated correspondence relational matrix $A^*_{i-1}$ dependence upon the said difference, to give an amended estimated correspondence relational matrix $A^*_i$, the said steps (i) and (ii) being performed by means of a Kalman filter and repeated at each time, say, $t_{i+1}$, $t_{i+2}$, etc at which a said difference occurs using respective estimated correspondence relational matrices $A^*_i$, $A^*_{i+1}$ etc and respective measured thickness distributions $P_i$, $P_{i+1}$ etc, so that successive said amended estimated correspondence relational matrices $A^*_{i+1}$ $A^*_{i+2}$ etc, are provided, whereby the measured thickness distribution $P_{i+1}$, $P_{i+2}$ etc approaches a target thickness distribution $\overline{P}$, (5) calculating, from the said estimated correspondence relational matrix resulting from step (4), an optimum setting for each adjusting means in dependence upon the target distribution $\overline{P}$, and (6) automatically controlling the settings of the adjusting means in accordance with the said optimum setting to provide an optimum thickness distribution.

The Kalman filter was published by R. E. Kalman in 1960, and is referred to, for example, in "Estimation and Control of Systems", by T. F. Elbert, Van Nostrand Reinhold company, 1984, chapters 1 and 7. In the Kalman filter, in a case where there are multidimensional variation factors ("forced terms") in a system equation, the multidimensional variation factors are sequentially estimated and sequentially amended using actual data (observed values) sequentially entered, and subsequent observed values are sequentially estimated by using the estimated and amended multidimensional variation factors.

The measured values of the thickness distribution of the sheet material after formation thereof by the sheet forming process and the data of the adjustment amounts of the adjusting means on the die are discrete successive values at any given time. Here, arbitrary successive times are expressed as $t_{i-1}$, $t_i$ and $t_{i+1}$. $t_i$ is a present time. The measured thickness distributions at the times $t_{i-1}$ and $t_i$ are expressed as $P_{i-1}$ and $P_i$ respectively. A difference between the measured thickness distributions at times $t_{i-1}$ and $t_i$ is expressed as $\Delta P_i$. The following equation stands.

$$\Delta P_i = P_i - P_{i-1} \quad (1)$$

When the adjustment amount of the adjusting means on the die at the time $t_{i-1}$ is expressed as $B_{i-1}$, the measured thickness distribution $P_i$ of the sheet material at the time $t_i$ results from $B_{i-1}$. Thus, at the present time $t_i$, $B_{i-1}$, $P_{i-1}$ and $P_i$ are all known amounts.

In the method of the present invention, a system equation can be expressed as follows. Here, $A_{i-1}$ is a correspondence relational matrix at the time $t_{i-1}$.

$$\Delta P_i = A_{i-1} * B_{i-1} + \epsilon_i \quad (2)$$

$\epsilon_i$ is noise (error) vector.

The thickness distribution of the sheet material can be expressed as a vector including a plurality of discrete values, for example, the number m of such values may be 300. The adjustment amounts of the adjusting means can be expressed as a vector including a plurality of discrete values, for example, the number n of such values may be 100. This number n corresponds to, for example, the number of adjusting bolts aforementioned. The above system equation (2) is changed to the following equation.

$$\begin{pmatrix} \Delta_1 P_i \\ \cdot \\ \cdot \\ \cdot \\ \Delta_m P_i \end{pmatrix} = (A_{i-1}) \begin{pmatrix} {}_1B_{i-1} \\ \cdot \\ \cdot \\ \cdot \\ {}_nB_{i-1} \end{pmatrix} + \epsilon_i \quad (3)$$

$A_{i-1}$ is a multidimensional correspondence relational matrix representing a relation between $P_i$ and $B_{i-1}$. This correspondence relational matrix $A_{i-1}$ is sequentially estimated and amended by a Kalman filter, using actual measured data of the thickness distribution sequentially entered. By $A_{i-1}$, the correspondence relationship between the adjusting means on the die and the thickness distribution (thickness profile) of the sheet material after its formation can be obtained with excellent accuracy.

When the optimum correspondence relational matrix which is estimated at the time $t_{i-1}$ is expressed as $A^*_{i-1}$, the following equation stands from the equation (2).

$$\Delta P^*_i = A^*_{i-1} * B_{i-1} + \epsilon_i \quad (4)$$

$\Delta P^*_i$ is an estimated difference between the thickness distribution at the time $t_{i-1}$ and the thickness distribution at the present time $t_i$, estimated by use of $A^*_{i-1}$. The following equation is derived from the equations (1) and (4).

$$P^*_i = P_{i-1} + \Delta P^*_i \quad (5)$$
$$= P_{i-1} + A^*_{i-1} {}^*B_{i-1} + \epsilon_i$$

Here, $P^*_i$ is an estimated thickness distribution (thickness profile) of the sheet material at the present time $t_i$ before the measured thickness distribution $P_i$ at the time $t_i$ can be obtained.

In the Kalman filter, the optimum correspondence relational matrix $A^*_{i-1}$, having been estimated at the time $t_{i-1}$, is amended according to the difference between the measured thickness distribution $P_i$ at the present time $t_i$ and the estimated thickness distribution $P^*_i$ at the time $t_i$ calculated by use of the optimum correspondence relational matrix $A^*_{i-1}$ estimated at the time $t_{i-1}$, and the optimum correspondence relational matrix $A^*_i$ at the present time $t_i$ is estimated therefrom.

The multidimensional variation factors in the present invention mean the factors where noises are eliminated from the difference between the measured thickness distribution $P_i$ at the present time $t_i$ and the estimated thickness distribution $P^*_i$ at the time $t_i$ calculated using the estimated thickness distribution $A^*_{i-1}$.

Moreover, the optimum adjustment amount $B^*_i$ of the adjusting means on the die at the time $t_i$ can be computed. Using the optimum correspondence relational matrix $A^*_i$ estimated at the present time $t_i$, the following equation stands from the equation (5).

$$P^*_{i+1} = P_i + A^*_i {}^*B_i + \epsilon_{i+1} \quad (6)$$

$P_i$ and $A^*_i$ are known values at the present time $t_i$ and the $P^*_{i+1}$ is an estimated thickness distribution at the time $t_{i+1}$ which will result by the operation of the adjustment amount $B_i$ of the adjusting means at the time $t_i$.

When a target thickness distribution of the sheet material after its formation is $\bar{P}$, a $B^*_i$ which minimizes the difference between $\bar{P}$ and $P^*_{i+1}$ in accordance with $B_i$ can be calculated as follows.

$$J = \sum_{k=1}^{m} ({}_k\bar{P} - {}_kP^*_{i+1})^2 + \sum_{j=1}^{n} {}_jB_i^2 \quad (7)$$
$$= \sum_{k=1}^{m} \left\{ {}_k\bar{P} - {}_kP_i - \sum_{j=1}^{n} ({}_{kj}A^*_i {}_jB_i) - \epsilon_{i+1} \right\}^2 + \sum_{j=1}^{n} {}_jB_i^2$$

Here, J is an evaluation function. By calculating the $B_i$ that can minimize this evaluation function J, $B^*_i$ can be obtained. Therefore, a $B_i$ that can satisfy the extreme value of the equation (7) may be calculated.

$$dJ/dB_i = 0 \quad (8)$$

In other words, a $B_i$ that satisfies the equation (8) is the optimum adjustment amount $B^*_i$ of the adjusting means at the time $t_i$. Thus, the thickness control of the sheet material with a very high accuracy can be achieved in comparison with the conventional methods, by estimating the optimum adjustment amount of the adjusting means.

In the above sequential estimation, every time that the thickness distribution of the sheet material is actually measured, the data is fed back, and the correspondence relational matrix A is sequentially amended using data from a given time and data from a time previous to the given time. Therefore, even if a variation of a condition in the sheet forming process occurs, the estimation of the optimum correspondence relational matrix is continued, so that the variation is automatically accounted for. Thus the accurate thickness control of the sheet material can be maintained.

In other words, in the above statistical sequential estimation using a Kalman filter, the controller including the Kalman filter self-learns and the correspondence relational matrix is automatically and sequentially amended using actual measured data, so that the thickness distribution of the sheet material after formation thereof by the sheet forming process can accurately correspond to the positions and adjustment amounts of the adjusting means on the die.

Since the calculating of the correspondence relational matrix is a sequential estimation, it is necessary to provide certain initial data. This initial data may be by appropriate data. For instance, an appropriate correspondence relationship between the thickness distribution of the sheet material and the adjusting means on the die or a correspondence relational matrix employed when a previous production of the sheet material has been performed or finished, or a rough correspondence relationship data resulting from a test such as the previously mentioned forced test, the results of which are shown in FIG. 14, may be set as an initial value. The initial data provides a starting point, and as abovementioned, the accurate correspondence relational matrix is sequentially estimated promptly using a Kalman filter.

Next, a method, in accordance with the second aspect of the invention, for monitoring a correspondence relationship between the thickness distribution of a sheet material and means for adjusting the thickness is explained as follows. A plurality of such means for adjusting the thickness of a web of molten material delivered from a die is disposed on the die in the width direction of the web. The sheet material is formed by delivering the web of molten material from the die and subjecting the web of molten material to a sheet forming process. The method includes the steps of:

(1) for each adjusting means, providing
  (i) an estimate, which is at least a rough estimate, of a correspondence relationship between (a) a position of the adjusting means on the die in the width direction of the web of molten material and an amount of adjustment of the adjusting means at a given time, and (b) after formation of the sheet material by the sheet forming process, a position on the sheet at which position the thickness of the sheet is varied by the said adjustment of the adjusting means and an amount of thickness variation at a time subsequent to the said given time and caused by the said adjustment at the given time, thereby to obtain an estimated correspondence relational matrix $A^*_{i-1}$ for all said adjusting means, and
  (ii) a measured thickness distribution, $P_{i-1}$, in the width direction of the sheet material at a time $t_{i-1}$,
(2) measuring the thickness distribution, $P_i$, in the width direction of the sheet material at a time $t_i$,
(3) using an equation including the estimated correspondence relational matrix, $A^*_{i-1}$, and the measured thickness distribution $P_{i-1}$,
  (i) calculating an estimated thickness distribution, $P^*_i$, time $t_i$ and determining the difference between the estimated thickness distribution $P^*_i$ and the measured thickness distribution $P_i$, and (ii) where a said difference occurs, amending the said estimated correspondence relational matrix $A^*_{i-1}$ in dependence upon the said difference, to give an amended estimated correspondence relational matrix $A^*_i$, the said steps (i) and (ii) being performed by means of a Kalman filter and repeated at each time, say, $t_{i+1}$, $t_{i+2}$, etc at which a said difference occurs using respective estimated correspondence relational matrices $A^*_i$, $A^*_{i+1}$ etc and respective measured thickness distributions $P_i$, $P_{i+1}$ etc, so that successive said amended estimated correspondence relational matrices $A^*_{i+1}$, $A^*_{i+2}$ etc, are provided, and (4) displaying at least a correspondence relationship between the position of the adjusting means on the die in the width direction of the web of molten material and the position on the sheet in the width direction of the sheet material after formation of the said sheet material by the sheet forming process at which position the thickness of sheet is varied by the adjustment of adjusting means, according to said amended estimated correspondence relational matrix, $A^*_{i+1}$, $A^*_{i+2}$, etc, on a display means.

In the monitoring method, the step for estimating the correspondence relational matrix by use of a Kalman filter in the aforementioned thickness control method is utilized, and from the estimated matrix, feedback information capable of being fed back to the sheet forming process and effective in providing the sheet material with a uniform quality in the width direction can be obtained.

In the monitoring method, all of the steps in the aforementioned thickness control method are not always required. To calculate the correspondence relational matrix using a Kalman filter, the data of the adjustment amounts of the adjusting means and the data of the thickness distribution of the sheet material resulting from the adjustment of the adjusting means may be entered repeatedly. Therefore, the adjustment of the adjusting means according to the thickness distribution of the sheet material may be controlled via a conventional controller, or the adjusting means may be manually adjusted. In these cases, however, the control accuracy of the thickness distribution of the sheet material after formation, that is, the difference between a target distribution and an actual distribution remains at the conventional level, and only provide the advantage that the feedback information which can be used to control the sheet forming process can be observed. In the case where both of the thickness control method according to the present invention and the monitoring method according to the present invention are employed, the thickness distribution of the sheet material can be controlled with an extremely high accuracy so as to approach a target distribution and at the same time the feedback information effective for controlling the sheet forming process can be observed.

The feedback information effective to provide the sheet material with the uniform quality in the width direction is displayed on a display means, for example, a display unit and/or a printer. On the display means, at least the correspondence relationship, between the position of the adjusting means on the die in the width direction of the web of molten material and the position of the sheet material in the width direction of the sheet material after formation of the sheet material by the sheet forming process at which position the thickness of the sheet material is varied by the adjustment of the adjusting means, is displayed.

From the displayed correspondence relationship, the following information can be obtained.

The adjusting means on the die are arranged in the width direction of the sheet material, usually with a uniform pitch. However, in the sheet material after formation, the pitches between the positions of the sheet material in the width direction corresponding to the positions of the adjusting means on the die are not always uniform, because there are nonuniformities and/or variations of the conditions in the sheet material forming process. If the nonuniformity of the pitches of the positions of the sheet material can be ascertained, how to correct the conditions (for example, temperature condition and mechanical condition) in the sheet forming process in order to make the pitches uniform can often be understood. Therefore, by adequately correcting the temperature condition, mechanical condition etc. of the sheet forming process, the pitches of the positions of the sheet material can approach a desired uniform pitch. That the pitches are uniform shows that the treatment in the sheet forming process has been performed uniformly. By making the pitches uniform, the quality of the sheet material obtained can be made uniform in the width direction.

BRIEF DESCRIPTION OF THE DRAWINGS

The above and other objects, features and advantages of the present invention will become apparent and more readily appreciated from the following detailed description of the preferred exemplary embodiments of the invention, taken in conjunction with the accompanying drawings which are given by way of illustration only, and thus are not limitative of the present invention, and wherein.

DETAILED DESCRIPTION OF THE PREFERRED EMBODIMENTS

Some preferred embodiments of the present invention will be described hereunder with reference to the attached drawings.

Figure 1:
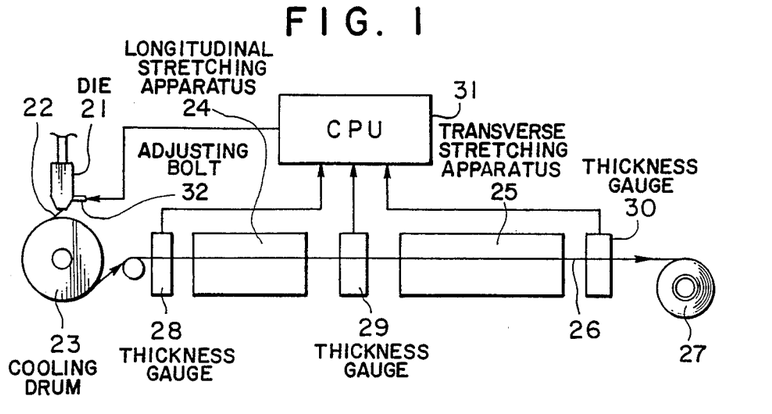
FIG. 1 is a schematic side view of a film manufacturing system including a control device for use in a method of controlling the thickness of a sheet material according to an embodiment of the present invention.

FIG. 1 illustrates a biaxially oriented film manufacturing system including a thickness control system for carrying out the method according to the present invention.

In FIG. 1, a die 21 delivers a web 22 of molten resin. The web 22 of molten resin delivered from the die 21 is cooled and formed by a cooling drum (casting drum) 23. After that, the cooled and formed sheet (web) is stretched in the longitudinal direction of the sheet during passage through an apparatus 24 having pre-heating, longitudinal stretching and thermosetting (cooling) means, and then the sheet is stretched in the width direction of the sheet during passage through an apparatus 25 having pre-heating, transverse stretching and thermosetting (cooling) means. Thus a film 26 having a predetermined thickness can be formed and the film is wound by an appropriate winder 27.

A sheet forming process according to the present invention means any one or more, or all of the processes carried out using apparatus such as 23, 24 and 25. Although, in the above embodiment, the film-forming process has three stages because a biaxially oriented film is required, a sheet forming process which may be controlled by the method of the invention may be of another type. For example, it may be a manufacturing process having only a cooling and a forming stage for the web of molten resin from the die, or such a process which additionally has a longitudinal-stretching stage, or a manufacturing process having a further stretching stage after the biaxial stretching stages.

In the embodiment for biaxial stretching described above, the thickness distributions of the sheet, or the final film, are measured at respective positions downstream of the cooling drum 23, downstream of the longitudinal-stretching apparatus 24 and downstream of the transverse-stretching apparatus 25 arranged in the running direction of the film by thickness gauges 28, 29 and 30, respectively. The respective measured data provided by the thickness gauges 28, 29 and 30 are entered into control processing unit CPU 31 which acts as a controller. In CPU 31, respective target thickness distributions in the width direction of the film at the positions of thickness gauges 28, 29 and 30 can be pre-set.

On the die 21, a plurality of adjusting bolts 32 as respective means for adjusting the thickness of the delivered web 22 of molten resin are disposed with a small pitch in the direction perpendicular to the sheet of paper containing FIG. 1, that is, in the width direction of the web of molten resin delivered from the die. The number of the adjusting bolts 32 is, for example, 100.

Figure 2:
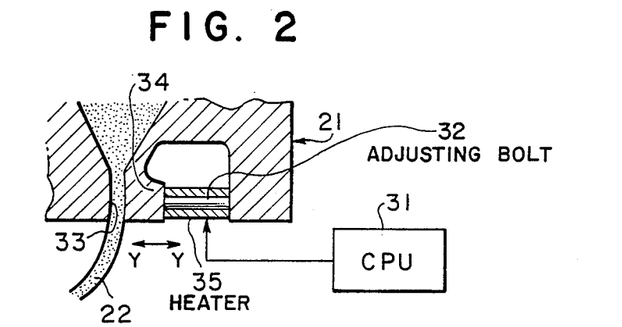
FIG. 2 is an enlarged partial sectional view of a die shown in FIG. 1.
Figure 3:
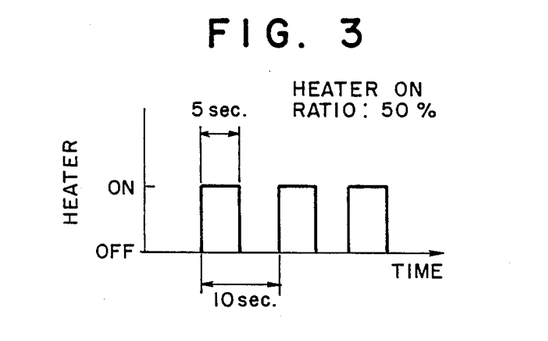
FIG. 3 is a time chart showing an example of an on-off control ratio of a heater shown in FIG. 2.

The detail of this portion, for example, is shown in FIG. 2. Many adjusting bolts 32 are arranged on one of the blocks 34 defining a slit 33 delivering the web 22 of molten resin, in the direction perpendicular to the sheet of paper containing FIG. 2. Heater 35 is provided around or in the adjusting bolt 32, the expansion and contraction of the bolt in the direction Y—Y is controlled by the control of temperature due to the heater, and the gap of the slit 33 is adjusted by the controller CPU 31. The control of temperature due to the heater 35 is performed by controlling the on-off control ratio of the heater. For example, as shown in FIG. 3, the on-off control ratio is controlled with intervals of 10 seconds, and for instance, if the heater 35 is on for a period of time of 5 seconds in every interval, the on-off control ratio becomes 50%. This controlling of the on-off control ratio can be easily performed, even if the on time to be controlled or changed is fairly short, for example, 0.1 second.

The heater 35 may be controlled by adjustment of applied voltage. Furthermore, adjusting means other than the means for adjusting the heater may be employed. For example, in one embodiment, the heater is eliminated and a motor which can rotate the bolt is provided, the rotation of the bolt being controllable by the motor.

A Kalman filter is built into the CPU 31. The correspondence relational matrix A having been shown in the aforementioned equation (5) is estimated in the manner schematically shown in FIG. 4. Since the thickness gauges 28, 29 and 30 are provided at three positions in this embodiment, respective correspondence relational matrices between the adjusting bolts 32 and the thickness distributions in accordance with the three positions in the running direction of the film can be obtained. By controlling the thickness distributions of the film at respective positions after three film forming processes, the thickness control of the film can be performed more precisely and the thickness and thickness distribution of the film after the final process (the transverse-stretching process performed by apparatus 25) can approach the target thickness and thickness distribution more closely with high accuracy.

Figure 4:
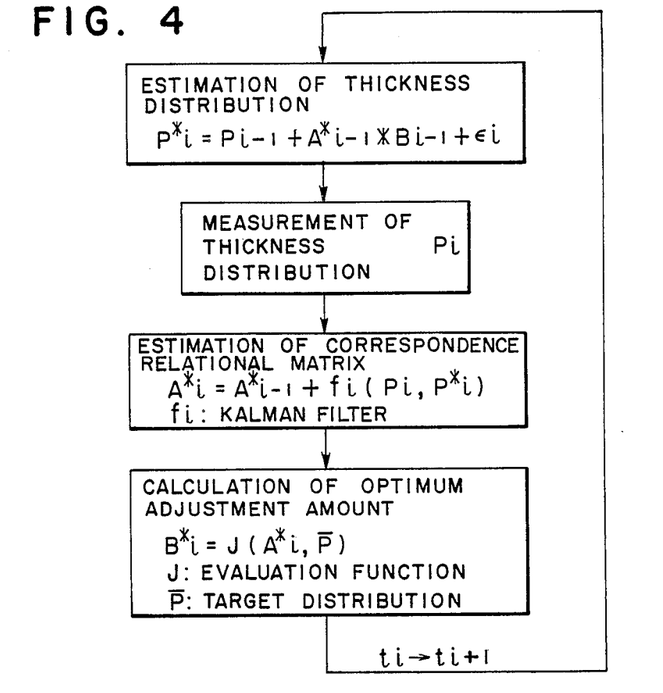
FIG. 4 is a block diagram showing an arithmetic process in an estimation by use of a Kalman filter.

The sequential estimation shown in FIG. 4 is explained in relation to an estimation at the position of thickness gauge 30, that is, an estimation for the thickness control of a final film product which has passed through all the sheet forming processes. The actually measured thickness distributions are entered from the thickness gauge 30 to CPU 31 discretely, such as at time $t_i$, at time $t_{i+1}$, ... In the Kalman filter in CPU 31, the thickness distribution $P^*_i$ at the time $t_i$ which will be obtained by the adjustment of the adjusting bolts 32 at the time $t_{i-1}$ is estimated using the equation (5) including the optimum correspondence relational matrix $A^*_{i-1}$ and also using the data measured before the time $t_i$. The estimated value is compared with the actually measured data at the time $t_i$ and the difference is calculated as a deviation distribution. The optimum correspondence relational matrix $A^*_i$ is estimated by amending the deviation distribution using a Kalman gain so as to enable the deviation distribution to approach zero. This arithmetic calculation is sequentially performed each time the actual data from the thickness gauge 30 is entered into CPU 31. As a result, the deviation distribution gradually approaches zero. Accordingly, the correspondence relational matrix A is sequentially amended and estimated to the optimum correspondence relational matrix so that the matrix can precisely show the relationship between the adjusting bolts 32 and the thickness distribution. Since the estimation is performed sequentially, however, an input of appropriate initial data must be supplied as aforementioned.

The amount of adjustment of each of the adjusting bolts 32 can be calculated using the sequentially estimated correspondence relational matrix A so that the thickness distribution to be measured by the thickness gauge 30 may approach a target distribution which is pre-set in CPU 31, as shown in the aforementioned equation (7). According to the output due to this calculation, the on-off control ratio of the heater 35 on each of the adjusting bolts 32 is controlled.

Figure 5:
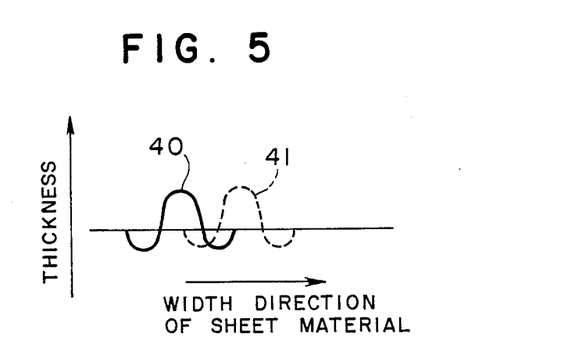
FIG. 5 is a graph showing the effect of controlling the thickness of a sheet material and variation of the thickness by a method using the system shown in FIG. 1.
Figure 6:
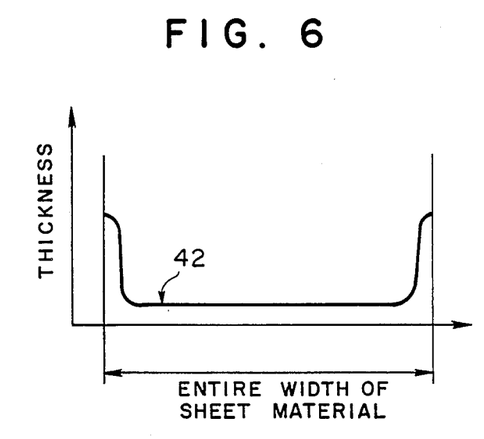
FIG. 6 is a graph showing an example of a target thickness distribution of a sheet material.

In the thickness control, for example, as shown in FIG. 5, the thickness of the film at the position corresponding to the position of the adjusting bolt 32 is slightly changed by the adjustment of the bolt so as to appear as a thickness profile 40, the thickness of the film at the adjacent position is changed by the adjustment of the adjacent bolt so as to appear as a thickness profile 41, and these small thickness variations are laminated in the width direction of the film. Then, all of the adjusting bolts 32 are controlled using the sequentially estimated correspondence relational matrix A so that the thickness profile of the film over the entire width may become that of a pre-set target profile such as a profile 42 shown in FIG. 6.

Thus, since the correspondence relational matrix A is obtained with high accuracy by the statistical sequential estimation using a Kalman filter in the present invention, the relationship between the positions of the adjusting bolts 32 and the positions of the film after formation thereof in the width direction and the influence upon the thickness distribution of the film for a small unit adjustment of the adjusting bolt can be obtained accurately. By the correspondence relationships, actual thickness distribution of the film is controlled to a target distribution with high accuracy.

Moreover, since the actual measured data from the thickness gauge 30 are entered into CPU 31 at every measuring time and the correspondence relational matrix is sequentially amended by the entered data, the optimum matrix can be estimated in a short period of time and the matrix to be estimated automatically follows any process variation or fluctuation and is changed in a manner corresponding to the variation or fluctuation. Therefore, the optimum correspondence relationship can be maintained all the time during production.

Although the above explanation relates to the position of the thickness gauge 30, similar thickness controls can be performed at the positions of thickness gauges 28 and 29. By exercising control at each of the positions of the gauges 28, 29 and 30, more minute differences between the actual and the target correspondence relationships can be obtained.

In the method of the present invention, the sheet material is not restricted to a resin. The method of the present invention can be adopted to any material produced by a manufacturing process having a sheet forming stage, for example, the manufacture of glass or paper.

Next, FIGS. 7-10 show an embodiment of a system for monitoring a correspondence relationship between the thickness distribution of a sheet material and means for adjusting the thickness according to a method of the present invention.

Figure 7:
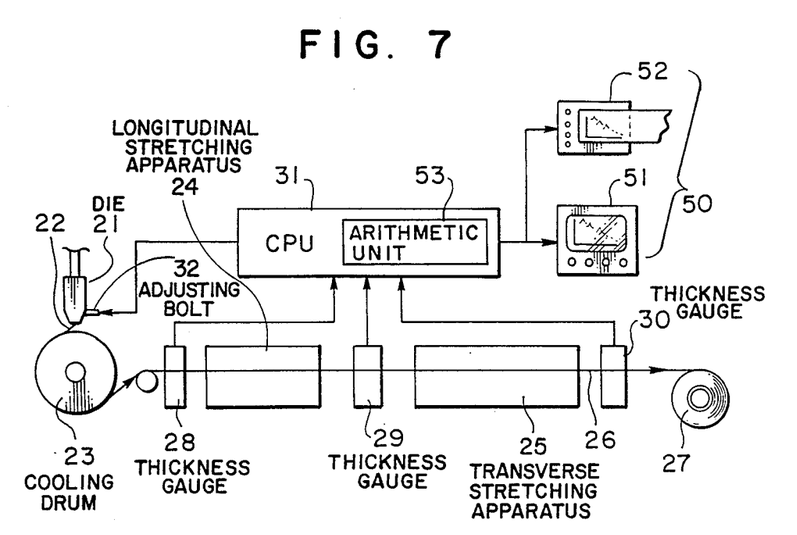
FIG. 7 is a schematic side view of a film manufacturing process showing a system for carrying out a monitoring method according to an embodiment of the present invention.

In the system shown in FIG. 7, a display means 50 is added to the system shown in FIG. 1. The display means 50 comprises a display unit 51 and a printer 52 connected to CPU 31. Alternatively, only one of the display unit 51 and the printer 52 may be provided.

An arithmetic unit 53 having a Kalman filter is built into CPU 31. In the arithmetic unit 53, the optimum correspondence relational matrixes $A^*$ and the optimum adjustment amounts of the adjusting means 32 required to render the thickness distribution of the film uniform are estimated using a Kalman filter from the data obtained by measurement of the thickness distributions in the width direction of the film entered from thickness gauges 28, 29 and 30 and the data of adjustment amounts of the adjusting bolts.

Figure 8:
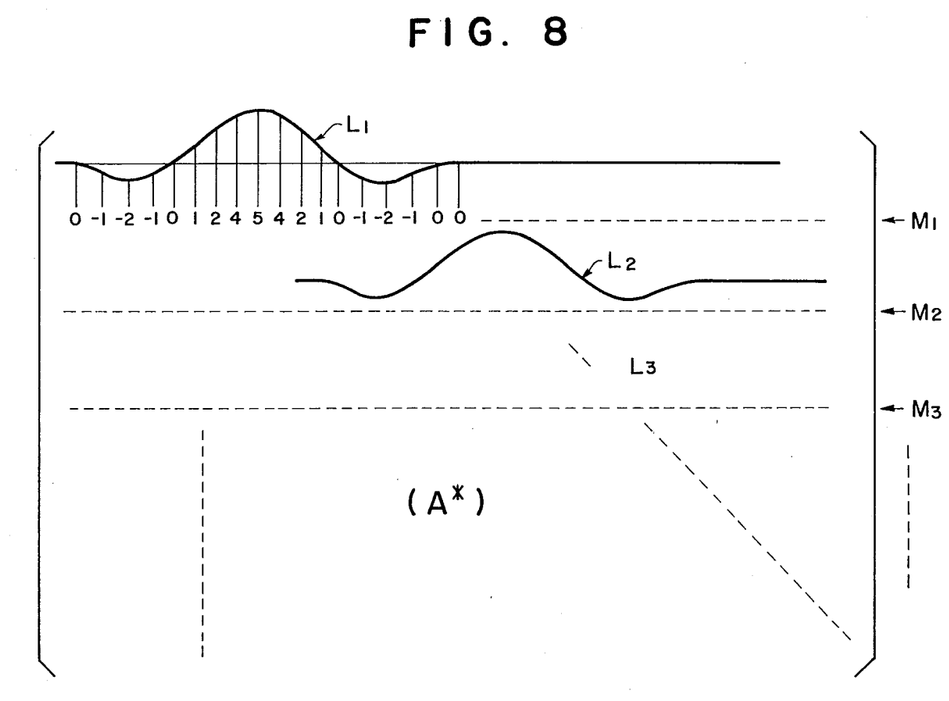
FIG. 8 is an explanatory diagram showing an example of a correspondence relational matrix.
Figure 9:
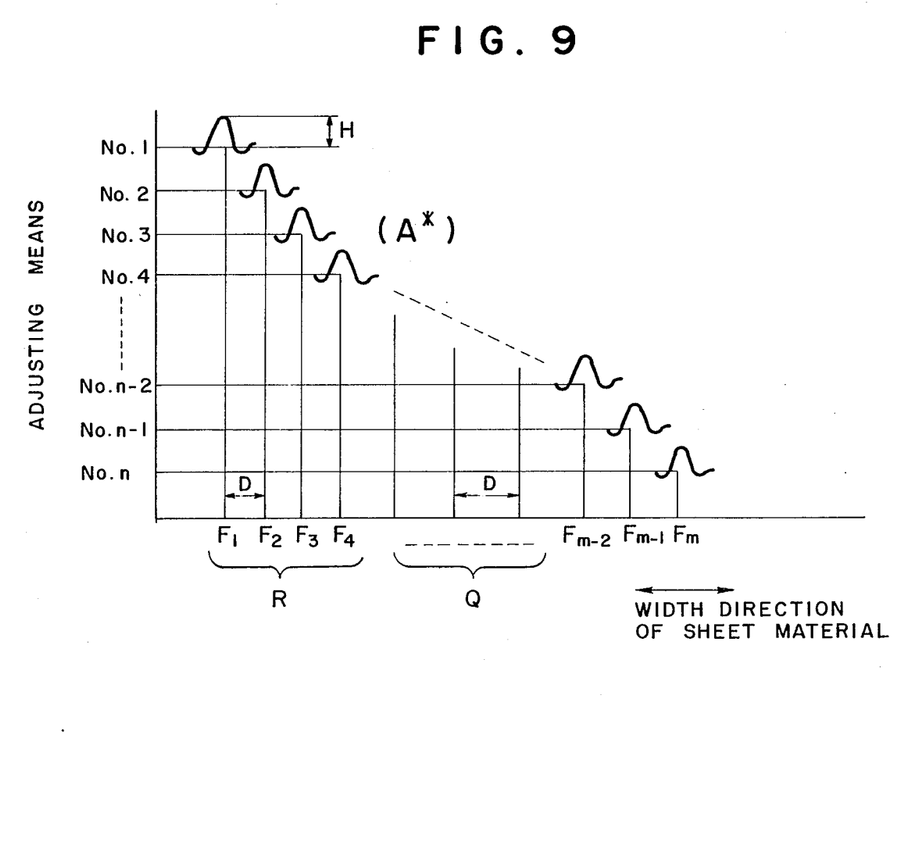
FIG. 9 is a graph showing an example of contents to be displayed on a display means of the system shown in FIG. 7.

The estimated correspondence relational matrix $A^*$ is displayed on display means 50. The matrix $A^*$ has, for example, a content such as that shown in FIG. 8. In FIG. 8, a series of numbers $M_1$, $M_2$, $M_3$ --- indicates the amounts of thickness variations of the film after formation and the positions where the thickness variations occur in the width direction of the film, in a case where each of the adjusting means 32 is adjusted by a unit amount of adjustment. The series of numbers can be expressed as thickness variation patterns of the film $L_1$, $L_2$, $L_3$ ---. The correspondence relational matrix $A^*$ is displayed on display means 50 as a graph, as shown in FIG. 9. In the graph shown in FIG. 9, the ordinate indicates the number (position) of the adjusting bolts 32, and the pitch between adjacent bolts is uniform. The abscissa indicates the positions of the film after formation by a sheet forming process and each position $F_1$, $F_2$, $F_3$ --- indicates the position where the greatest thickness variation occurs in the width direction of the film by the adjustment of each bolt No. 1, 2, 3 ---. Each line in the graph corresponds to each bolt.

The pitch between the positions $F_1$ and $F_2$ or $F_2$ and $F_3$ --- is varied by variations in the conditions of the sheet forming process. Therefore, by the nonuniformity of the pitches, the nonuniformity of the conditions in the sheet forming process can be understood. For instance, in the graph shown in FIG. 9, portion R extends to a relatively lesser degree in the width direction of the film because the pitches are relatively small and portion Q extends to a relatively greater degree because the pitches are relatively large. From this information, how the conditions of the sheet forming process such as temperature condition, mechanical condition etc. should be corrected in order to render uniform the pitches can be guessed. Then, when the conditions are adequately corrected, the pitch D can become uniform and the treatment in the sheet forming process can be uniformly performed. Thus a film having a uniform quality in the width direction can be obtained.

Figure 10:
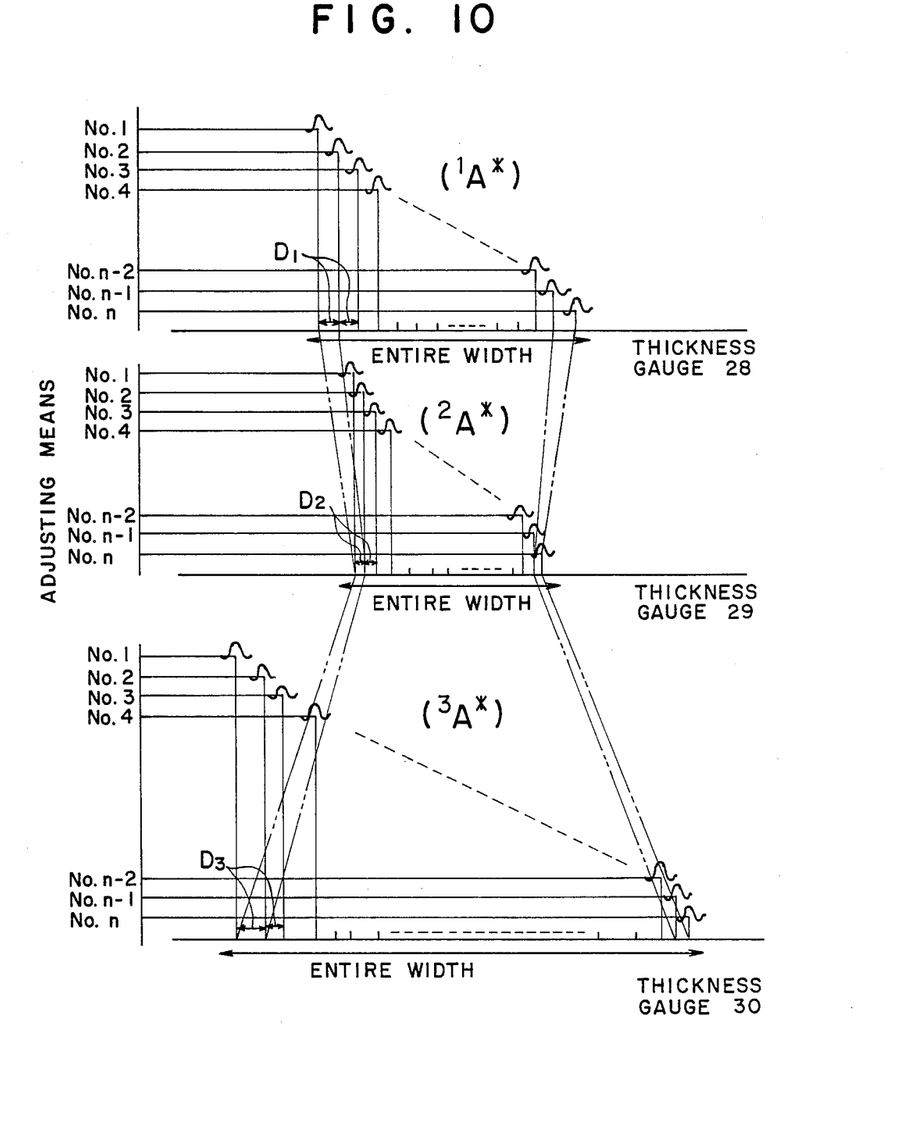
FIG. 10 is a graph simultaneously showing correspondence relational matrices at the positions of respective thickness gauges of the system shown in FIG. 7.

Such information can be obtained at each position of thickness gauges 28, 29 and 30. FIG. 10 shows a graph simultaneously illustrating the correspondence relational matrices at the positions of three thickness gauges, which matrices have been respectively displayed on the display means 50. In this embodiment shown in FIG. 10, the correspondence relational matrix $^1A^*$ has relatively uniform pitch $D_1$ at the position of thickness gauge 28. From this it can be seen that the treatment in the cooling and forming process 23 has been relatively uniform. It can also be seen that, in the correspondence relational matrix $^2A^*$ at the position of thickness gauge 29, the pitch $D_2$ becomes a little nonuniform, and the treatment in the longitudinal-stretching process performed by apparatus 24 has been a little nonuniform. At the position of thickness gauge 30, the pitch $D_3$ in the correspondence relational matrix $^3A^*$ becomes fairly nonuniform. Since the film passes through the transverse-stretching apparatus 25, nonuniformity of the conditions in the process directly affects the uniformity of the pitch $D_3$. Thus, the nonuniformity of the conditions can be guessed in accordance with each of the forming processes, and adequate actions can be performed on each process in order to render uniform the quality of the finally formed film in the width direction.

Moreover, since a variation amount H (FIG. 9) of film thickness due to a unit adjustment of the adjusting bolt 32 is also displayed on the display means 50, the degree of effect of each adjusting bolt can be observed. However, in a case where the display content is used only for information to be fed back to the sheet material forming process, only the correspondence relationship between the positions of the adjusting bolts and the positions of the film in the width direction need be displayed.

Figure 11:
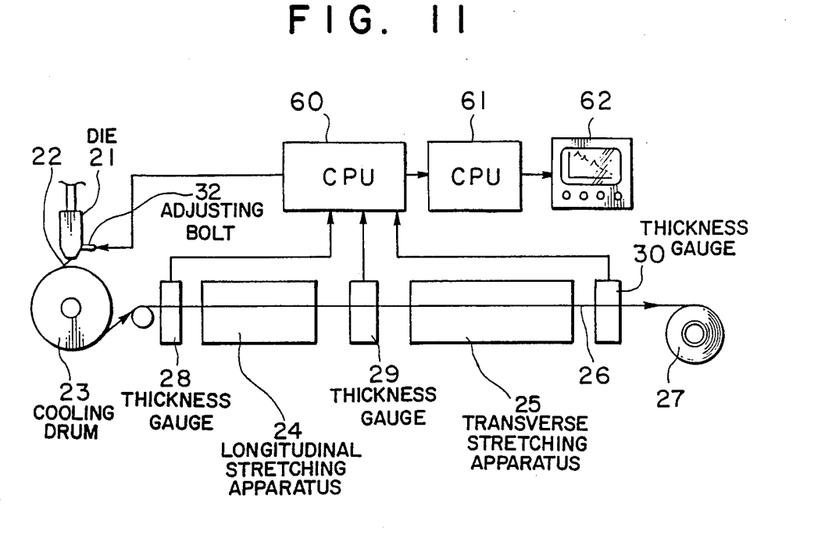
FIG. 11 is a schematic side view of a film manufacturing system wherein an arithmetic unit with a Kalman filter and a display means according to the present invention are connected to a conventional thickness control system.
Figure 12:
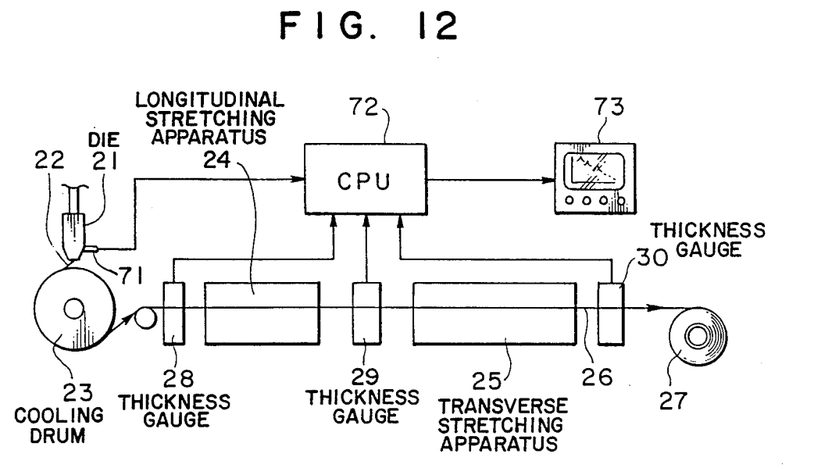
FIG. 12 is a schematic side view of a film manufacturing system wherein an arithmetic unit with a Kalman filter and a display means according to the present invention are adapted to cooperate with a manual thickness control system.

A monitoring method according to the present invention can be adopted to a case where the thickness control of the film is performed by a conventional method. FIG. 11 and FIG. 12 show such embodiments.

In a system shown in FIG. 11, a Kalman filter is not built into CPU 60, but is built into CPU 61 as an arithmetic unit which is connected to CPU 60. The data of adjustment amounts of the adjusting bolts 32 and the data of measured thickness distributions from the thickness gauges 28, 29 and 30 are entered into CPU 61 via CPU 60, repeatedly. From the repeatedly entered data, the correspondence relational matrix $A^*$ can also be estimated in the same manner as aforementioned. The matrix $A^*$ thus obtained is displayed on a display unit 62.

In a system shown in FIG. 12, adjusting bolts 71 are manually adjusted after observing the data of thickness distribution of the film from the thickness gauges 28, 29 and 30. The adjustment amounts of the adjusting bolts 71 are entered into CPU 72 as an arithmetic unit via appropriate detecting means (not shown) and the data of thickness distributions from the gauges 28, 29 and 30 which result from the adjustment of the adjusting bolts entered into CPU 72. The sets of enterings are repeated, and the correspondence relational matrix $A^*$ is estimated using a Kalman filter in the CPU 72. The estimated matrix $A^*$ is displayed on a display unit 73.

Thus, also in the systems shown in FIGS. 11 and 12, the correspondence relational matrix $A^*$ can be obtained, and from the display of the matrix the feedback information effective for the corrections of the conditions of sheet forming processes can be obtained. Since the thickness control systems are conventional methods in the above cases, however, improvement of the thickness distribution cannot always be expected.

Furthermore, the monitoring method according to the present invention can also be adopted to processes for manufacturing glass, paper etc. without restriction to the manufacture of resin film.

Although several preferred embodiments of the present invention have been described in detail, it will be appreciated by those skilled in the art that various modifications and alterations can be made to the particular embodiments shown without materially departing from the novel teachings and advantages of this invention. Accordingly, it is to be understood that all such modifications and alterations are included within the scope of the invention as defined by the following claims.

What is claimed is:

1. A method for controlling the thickness of a sheet of material formed by delivering a web of molten material from a die and subjecting the web of molten material to a sheet forming process, which method includes the steps of
    (1) providing on the die a plurality of means for adjusting the thickness of the web of molten material,
    (2) for each adjusting means, providing
        (i) an estimate, which is at least a rough estimate, of a correspondence relationship between (a) a position of the adjusting means on the die in the width direction of the adjusting means at a given time, and (b) after formation of the sheet material by the sheet forming process, a position on the sheet material by the sheet forming process, a position on the sheet at which position the thickness of the sheet is varied by the said adjustment of the adjusting means and an amount of thickness variation at a time subsequent to the said given time and caused by the said adjustment at the given time, thereby to obtain an estimated correspondence relational matrix $A^*_{i-1}$ for all said adjusting means, and
        (ii) a measured thickness distribution, $P_{i-1}$, in the width direction of the sheet material at a time $t_{i-1}$,
    (3) measuring the thickness distribution, $P_i$, in the width direction of the sheet material at a time $t_i$,
    (4) using an equation including the estimated correspondence relational matrix, $A^*_{i-1}$, and the measured thickness distribution $P_{i-1}$,
        (i) calculating an estimated thickness distribution, $P^*_i$, at a time $t_i$ and determining the difference between the estimated thickness distribution $P^*_i$ and the measured thickness distribution $P_i$, and
        (ii) where a said difference occurs, amending the said estimated correspondence relational matrix $A^*_{i-1}$ in dependence upon the said difference, to give an amended estimated correspondence relational matrix $A^*_i$,
        the said steps (i) and (ii) being performed by means of a Kalman filter and repeated at each time $t_{i-1}$, $t_{i+2}, \ldots t_{i+n}$ at which a said difference occurs using respective estimated correspondence relational matrices $A^*_i$, $A^*_{i+1}, \ldots A^*_{i+n}$ and respective measured thickness distributions $P_i$, $P_{i+1}, \ldots P_{i+n}$, so that said amended estimated correspondence relational matrices $A^*_{i+1}$, $A^*_{i+2}, \ldots A^*_{i+n}$, are successively provided, whereby the measured thickness distribution $P_{i+1}, P_{i+2}, \ldots P_{i+n}$ approaches a target thickness distribution $\overline{P}$,
    (5) calculating, from the said estimated correspondence relational matrix resulting from step (4), an optimum setting for each adjusting means in dependence upon the target distribution $\overline{P}$, and
    (6) automatically controlling the settings of the adjusting means in accordance with the said optimum setting to provide an optimum thickness distribution.

2. The method of claim 1, wherein said sheet forming process further comprises the steps of cooling the web of molten material delivered from the die so as to form a sheet material and stretching the sheet material formed by said cooling.

3. The method of claim 2, wherein said stretching includes longitudinal-stretching for stretching the sheet material in the longitudinal direction of the sheet material.

4. The method of claim 2, wherein said stretching includes longitudinal-stretching for stretching the sheet material in the longitudinal direction of the sheet material and transverse-stretching for stretching the sheet material in the width direction of the sheet material.

5. The method of claim 4, wherein the thickness distribution of the sheet material is measured after said cooling and forming steps, after said longitudinal-stretching and after said transverse-stretching.

6. The method of claim 1, wherein said adjusting means is a means for adjusting a gap provided by a slit of the die.

7. The method of claim 6, wherein said adjusting means expands and contracts and wherein said expansion and contraction is controlled by a heater.

8. The method of claim 7, wherein an on-off ratio of said heater is controlled.

9. The method of claim 1, wherein said step (2i) of obtaining said estimated correspondence relational matrix $A^*_{i-1}$ further comprises using a correspondence relational matrix employed in a previous production process of a sheet material as an initial value of the correspondence relational matrix to be amended.

10. The method of claim 1, wherein said step (2i) of obtaining said correspondence relational matrix $A^*_{i-1}$ comprises using data obtained by a preliminary test, which comprises deliberate actuation of the adjusting means, as an initial value of the correspondence relational matrix to be amended, wherein a pre-selected said adjusting means is deliberately adjusted by a constant amount and a variation of the thickness distribution of the sheet material after formation by the sheet forming process when said deliberate adjustment has been performed is measured.

11. The method of claim 1, wherein said sheet material is a resin film.

12. A method for monitoring a correspondence relationship between the thickness distribution of a sheet material in the width direction of the sheet material and a plurality of means for adjusting the thickness of a web of molten material delivered from a die, said sheet material being formed by delivering the web of molten material from the die and subjecting the web of molten material to a sheet forming process, said adjusting means being disposed on the die in the width direction of the web of molten material, which method includes the steps of (1) for each adjusting means, providing
  (i) an estimate, which is at least a rough estimate, of a correspondence relationship between (a) a position of the adjusting means on the die in the width direction of the web of molten material and an amount of adjustment of the adjusting means at a given time, and (b) after formation of the sheet material by the sheet forming process, a position on the sheet at which position the thickness of the sheet is varied by the said adjustment of the adjusting means and an amount of thickness variation at a time subsequent to the said given time and caused by the said adjustment at the given time, thereby to obtain an estimated correspondence relational matrixd $A^*_{i-1}$ for all said adjusting means, and
  (ii) a measured thickness distribution, $P_{i-1}$, in the width direction of the sheet material at a time $t_{i-1}$, (2) measuring the thickness distribution, $P_i$, in the width direction of the sheet material at a time $t_i$, (3) using an equation including the estimated correspondence relational matrix, $A^*_{i-1}$, and the measured thickness distribution $P_{i-1}$,
  (i) calculating an estimated thickness distribution, $P^*_i$, at a time $t_i$ and determining the difference between the estimated thickness distribution $P^*_i$ and the measured thickness distribution $P_i$, and
  (ii) where a said difference occurs, amending the said estimated correspondence relational matrix $A^*_{i-1}$ in dependence upon the said difference, to given an amended estimated correspondence relational matrix $A^*_i$,
the said steps (i) and (ii) being performed by means of a Kalman filter and repeated at each time $t_{i+1}$, $t_{i+2}, \ldots t_{i+n}$ at which a said difference occurs using respective estimated correspondence relational matrices $A^*_i, A^*_{i+1}, \ldots A^*_{i+n}$ and respective measured thickness distributions $P_i, P_{i+1}, \ldots P_{i+n}$, so that said amended estimated correspondence relational matrices $A^*_{i+1}, A^*_{i+2}, \ldots A^*_{i+n}$, are successively provided, and (4) displaying at least a correspondence relationship between the position of the adjusting means on the die in the width direction of the web of molten material and the position on the sheet in the width direction of the sheet material after formation of the said sheet material by the sheet forming process at which position the thickness of sheet is varied by the adjustment of adjusting means, according to said amended estimated correspondence relational matrix, $A^*_{i+1}, A^*_{i+2}, \ldots A^*_{i+n}$, on a display means.

13. The method of claim 12, wherein said method of monitoring further comprises adjustment of the adjusting means via a controller into which the measured thickness distribution of the sheet material after formation thereof by the sheet forming process is entered wherein an arithmetic unit having a Kalman filter is incorporated directly into said controller.

14. The method of claim 12, wherein said method of monitoring further comprises adjusting of the adjusting means via a controller into which the measure thickness distribution of the sheet material after formation thereof by the sheet forming process is entered wherein an arithmetic unit having a Kalman filter is connected to said controller.

15. The method of claim 12, wherein said method of monitoring further comprises manually adjusting said plurality of adjusting means.

16. The method of claim 12, wherein said displaying is performed on a display unit.

17. The method of claim 12, wherein said displaying is performed on a printer.

18. The method of claim 12, wherein said sheet forming process further comprises the steps of cooling the web of molten material delivered from the die so as to form a sheet material and stretching the sheet material formed by said cooling.

19. The method of claim 18, wherein said stretching includes longitudinal-stretching for stretching the sheet material in the longitudinal direction of the sheet material.

20. The method of claim 18, wherein said stretching includes longitudinal-stretching for stretching the sheet material in the longitudinal direction of the sheet material and transverse-stretching for stretching the sheet material in the width direction of the sheet material.

21. The method of claim 20, wherein the thickness distribution of the sheet material is measured after said cooling and forming steps, after said longitudinal-stretching and after said transverse-stretching.

22. The method of claim 12, wherein said adjusting means is a means for adjusting a gap provided by a slit of the die.

23. The method of claim 12, wherein said step (2i) of obtaining said estimated correspondence relational matrix $A^*_{i-1}$ further comprises using a correspondence relational matrix employed in a previous production process of a sheet material as an initial value of the correspondence relational matrix to be amended.

24. The method of claim 12, wherein said sheet material is a resin film.

* * * * *